April 19, 1927.
F. A. PEARL
1,625,422
CONVERTIBLE COASTER WAGON
Filed March 8, 1926
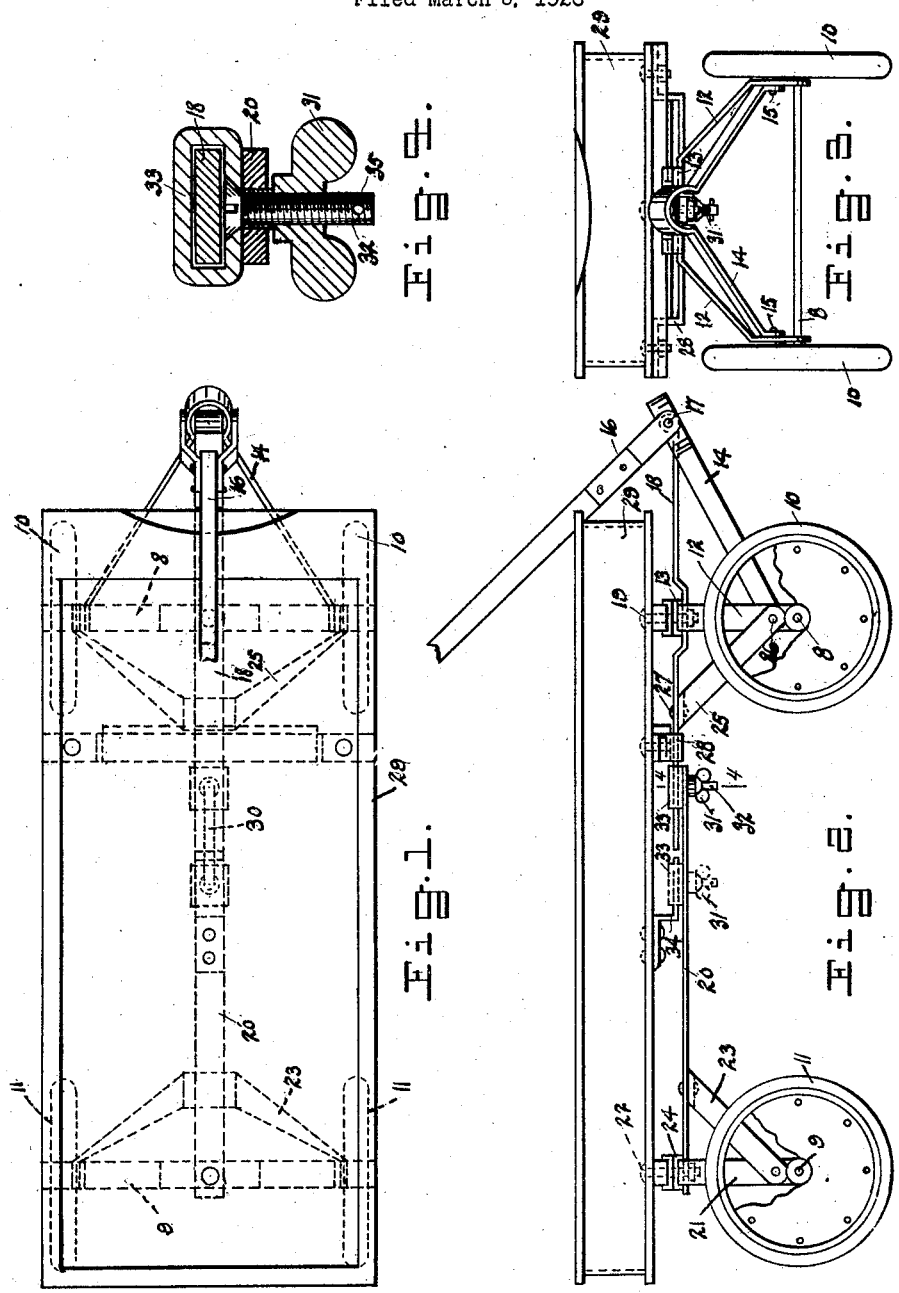
INVENTOR.
FRANK. A. PEARL.
BY
Morsell, Keeney & Morsell
ATTORNEYS.

Patented Apr. 19, 1927.

1,625,422

UNITED STATES PATENT OFFICE.

FRANK ALEXANDER PEARL, OF NORTH MILWAUKEE, WISCONSIN.

CONVERTIBLE COASTER WAGON.

Application filed March 8, 1926. Serial No. 93,167.

This invention relates to improvements in coaster wagons, and more particularly to a convertible coaster wagon.

It is one of the objects of the present invention to provide a coaster wagon which will operate either as a two wheel steering wagon or a four wheel steering wagon.

A further object of the invention is to provide a wagon provided with simple, manually operable mechanism to convert it from a two wheel steering wagon to a four wheel steering wagon and vice versa, the said mechanism being operable by a child.

A further object of the invention is to provide a coaster wagon having a pair of fifth wheels, one forwardly and the other rearwardly.

A further object of the invention is to provide a convertible coaster wagon which is of very simple construction, is strong and durable, is easily manipulated, and is well adapted for the purposes described.

With the above and other objects in view, the invention consists of the improved coaster wagon, and its parts and combinations as set forth in the claims, and all equivalents thereof.

In the accompanying drawing in which the same reference characters indicate the same parts in all of the views:

Fig. 1 is a plan view of the improved coaster wagon;

Fig. 2 is a side view thereof;

Fig. 3 is a front view; and

Fig. 4 is an enlarged detail sectional view taken on line 4—4 of Fig. 2.

Referring now more particularly to the drawing, it will be seen that the numerals 8 and 9 indicate the front and rear axles respectively of the wagon on which are revolubly mounted pairs of wheels 10 and 11.

A bracket 12 of flat bar metal extends upwardly from the front axle 8 and converges centrally to form a flattened portion parallel to the axle to which the lower portion of a bolster plate 13 is secured, said bolster plate forming the forward fifth wheel for the wagon.

A draft iron 14 is secured to the inner surface of the bracket 12 adjacent the axle 8 by means of rivets 15 and extends forwardly and upwardly to pivotally receive the inner end portion of a tongue 16 mounted on a pivot bolt 17. A front reach 18 formed of flat bar metal has its forward end portion looped about the bolt 17 and the same extends rearwardly under the bracket 12 to which it is secured by a king bolt 19. The front reach 18 extends rearwardly sufficiently far to overlap a rear reach 20 which is secured to a rear bracket 21 by a king bolt 22, the rear bracket 21 being similar to the front bracket 12 and being connected to the rear axle 9. A rear brace 23 is also secured to the bracket 21 and to the rear reach 20. A bolster plate 24 is mounted on the upper portion of the bracket 21 and forms a rear fifth wheel.

A brace 25 is secured to the bracket 12 by means of rivets 26 and extends upwardly and rearwardly to the front reach 18 to which it is riveted, as at 27.

A guide bar 28 of flat metal depends transversely from the under surface of a wagon box 29 and serves to support the rear portion of the reach 18 and limit the lateral movement thereof.

The forward end portion of the rear reach 20 is formed with a longitudinal slot 30 and the ends of the slot are enlarged to receive the sleeve portion of a wing nut 31 threaded onto a bolt 32. A metal sleeve 33, adapted to slide upon the rear end portion of the front reach 18 is revolubly connected with the bolt 32, as shown in Fig. 4. The sleeve 33 is also slidingly mounted on the upper surface of the rear reach 20 and the bolt 32 extends through the longitudinal slot 30 and is longitudinally movable therein; the sleeve being held in any position at either end of the slot by tightening the wing nut 31 to enter the enlarged end portions of the slot.

A locking bar 34 depends from the underside of the box 29 rearwardly of the end portion of the reach 18 and in normal horizontal alignment therewith. Obviously, the sleeve 33 may be slid from the reach to the locking bar and vice versa and secured in position on either, by means of the winged nut. The lower end portion of the shank of the bolt 32 is provided with a transverse aperture 35 to receive a cotter pin for the purpose of retaining the wing nut.

It is evident that if it is desired to use the wagon as a four wheel turn, the parts will be in the position indicated in full lines in Fig. 2 with the sleeve 33 engaging the front reach 18. Thus, a pivotal movement of the front reach will be transmitted to the rear reach to turn the rear bracket and rear axle. If it is desired to use the wagon as an ordinary two wheel turn, the sleeve 33 is slid rearwardly to the dotted line position shown in Fig. 2 to engage the locking bar 34. The front reach is then permitted to turn without moving the rear reach.

From the foregoing description it will be seen that the improved convertible wagon is of very simple and novel construction and is well adapted for the purposes set forth.

What I claim as my invention is:

1. In a coaster wagon having a box and a pair of pivotally mounted axles, a rear reach connected to the rear axle, a front reach connected to the front axle and overlapping the rear reach, a connecting member slidably and pivotally mounted on one of said reaches and removably engageable with the other reach, and a fixed bar depending from said box and adapted for engagement with said connecting member.

2. A convertible coaster wagon, comprising a box member, a pair of axles, a king bolt connecting each of the axles to the box, a draw iron connected to the front axle, a front reach connected to said draw iron, a rear reach connected with said rear axle and overlapped by said front reach, said rear reach having a longitudinal slot in its forward end portion, a slidable sleeve, a bolt passing through said slot and pivotally connected to said sleeve, said sleeve being slidable on said front reach, and a locking bar depending from the box and adapted to receive said sleeve.

In testimony whereof, I affix my signature.

FRANK ALEXANDER PEARL.